(12) United States Patent
Kanaoka et al.

(10) Patent No.: US 6,461,171 B2
(45) Date of Patent: Oct. 8, 2002

(54) ELECTRIC CONNECTOR BOX FOR A VEHICLE

(75) Inventors: Yoji Kanaoka; Koji Kano; Yusuke Funayose, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,685

(22) Filed: Mar. 30, 2001

(65) Prior Publication Data

US 2001/0046793 A1 Nov. 29, 2001

(30) Foreign Application Priority Data

Mar. 30, 2000 (JP) ........................................ 2000-093641

(51) Int. Cl.$^7$ .............................................. H01R 12/00
(52) U.S. Cl. .................... 439/76.2; 439/709; 439/949
(58) Field of Search ............................... 439/76.2, 727, 439/801, 836, 837, 863, 709, 716, 949

(56) References Cited

U.S. PATENT DOCUMENTS

| | | | | | |
|---|---|---|---|---|---|
| 1,023,326 | A | * | 4/1912 | Murray | 337/188 |
| 5,427,550 | A | * | 6/1995 | Jaag | 439/709 |
| 5,618,186 | A | * | 4/1997 | Saka et al. | 439/76.2 |
| 5,713,766 | A | * | 2/1998 | Davies et al. | 439/709 |
| 5,751,058 | A | * | 5/1998 | Matsuki | 257/692 |
| 6,162,097 | A | * | 12/2000 | Liang | 439/218 |
| 6,162,990 | A | * | 12/2000 | Sakamoto | 174/59 |
| 6,270,360 | B1 | * | 8/2001 | Yanase | 439/76.2 |

FOREIGN PATENT DOCUMENTS

JP B2982104 9/1999

* cited by examiner

*Primary Examiner*—Khiem Nguyen
*Assistant Examiner*—Michael C. Zarroli
(74) *Attorney, Agent, or Firm*—Birch, Stewart, Kolasch & Birch, LLP

(57) ABSTRACT

This invention relates to facilitating the layout of cables in an electric connector box for a vehicle. Within the fuse box are disposed a large number of plug-in type blade fuses and screw type fuses. A difference in height is provided between mounting surfaces of the block fuses between terminal boards. The terminal boards of one type of fuse is set at a higher position than the terminal boards of the other type of fuse. Therefore, cables can be drawn out in the same direction without mutual interference. Although cable, which is laid inside, is screwed to the back of a substrate, the height of a screw portion for the cable is also set so as to avoid interference of the cable with back connections of the blade fuses.

9 Claims, 7 Drawing Sheets

ELECTRIC CONNECTOR BOX FOR A VEHICLE

BACKGROUND OF THE INVENTION

1. Field of the Invention

The present invention relates to an electric connector box for a vehicle and particularly to an electric connector box for a vehicle suitable for facilitating the connection and layout of cables which are drawn out to the exterior and cables which are laid in the interior of the connector box, at the time of receiving plural circuit components within the connector box.

2. Description of Background Art

Due to subdivision of circuits the number of circuit components such as fuses used in vehicles such as automobiles and motorcycles is increasing in number. For containing such circuit components together there is used an electric connector box. For example, in Japanese Patent Publication No. 2982104 is disclosed an electric connector box for gathering and connecting electric systems, wherein a cable terminal mounting surface is inclined to attain the reduction of space.

The following problem is encountered in the case where screwed cable terminals and plug-in terminals of, for example, blade fuses or relay fuses are mixed together within an electric connector box. In the case where plural cable terminals are being connected, it has so far been necessary, for the layout to prevent cables from intersecting circuit components and inner cables, that the cables are laid along an outer wall surface in the interior of the electric connector box and that a large number of screw portions are dispersed on the outer wall surface. This may result in that the space for laying cables becomes large and that the whole of the electric connector box becomes large-sized.

SUMMARY AND OBJECTS OF THE INVENTION

It is an object of the present invention to provide an electric connector box for a vehicle capable of enhancing the degree of freedom for cable layout in the interior of the connector box and capable of making it easy to draw out cables to the exterior.

For achieving the above-mentioned object, the first feature of the present invention resides in an electric connector box for a vehicle, containing a plurality of circuit components disposed in an adjacent manner and having a mounting base for the circuit components, the plural circuit components each having at both longitudinal ends thereof screw portions to which cables can be connected, wherein the screw portions of the plural circuit components are arranged in line in a direction orthogonal to the longitudinal direction of the circuit components, the circuit components are mounted on the mounting base together with cables by utilizing the screw portions so that the cables are drawn out in a direction orthogonal to the longitudinal direction of the circuit components. The mounting base has a stepped mounting surface so that a mounting surface of a circuit component, out of the plural circuit components, that is larger in the number of screw portions which a cable associated with the circuit component intersects, is positioned higher than a mounting surface of a circuit component, out of the plural circuit components, that is smaller in the number of screw portions which a cable associated with the circuit component intersects.

According to the first feature of the invention, since plural circuit components are supported on a stepped mounting surface, plural cables drawn out perpendicularly from the circuit components do not interfere with each other.

The second feature of the present invention resides in an electric connector box for a vehicle, containing a plurality of circuit components in an adjacent manner, wherein the plural circuit components comprise a circuit component having screw terminals to which cables can be connected and a circuit component having plug-in terminals. The terminals of the circuit components are arranged in line in a direction orthogonal to the longitudinal direction of the circuit components, the cables being drawn out from the screw terminals in a direction orthogonal to the circuit components having the screw terminals, and between a mounting surface of the screw terminals and a mounting portion of the plug-in terminals there is provided a difference in height so that the mounting surface of the screw terminals is higher than the mounting portion of the plug-in terminals. Further, the third feature of the present invention resides in an electric connector box having the second feature and wherein the circuit component having the screw terminals is a block fuse and the circuit component having the plug-in terminals is a blade fuse.

According to the second and third features of the invention, since there is a difference in height between the screw terminals mounting surface and the plug-in terminals mounting portion, the cables drawn out from the screw terminals do not interfere with the plug-in terminals mounting portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
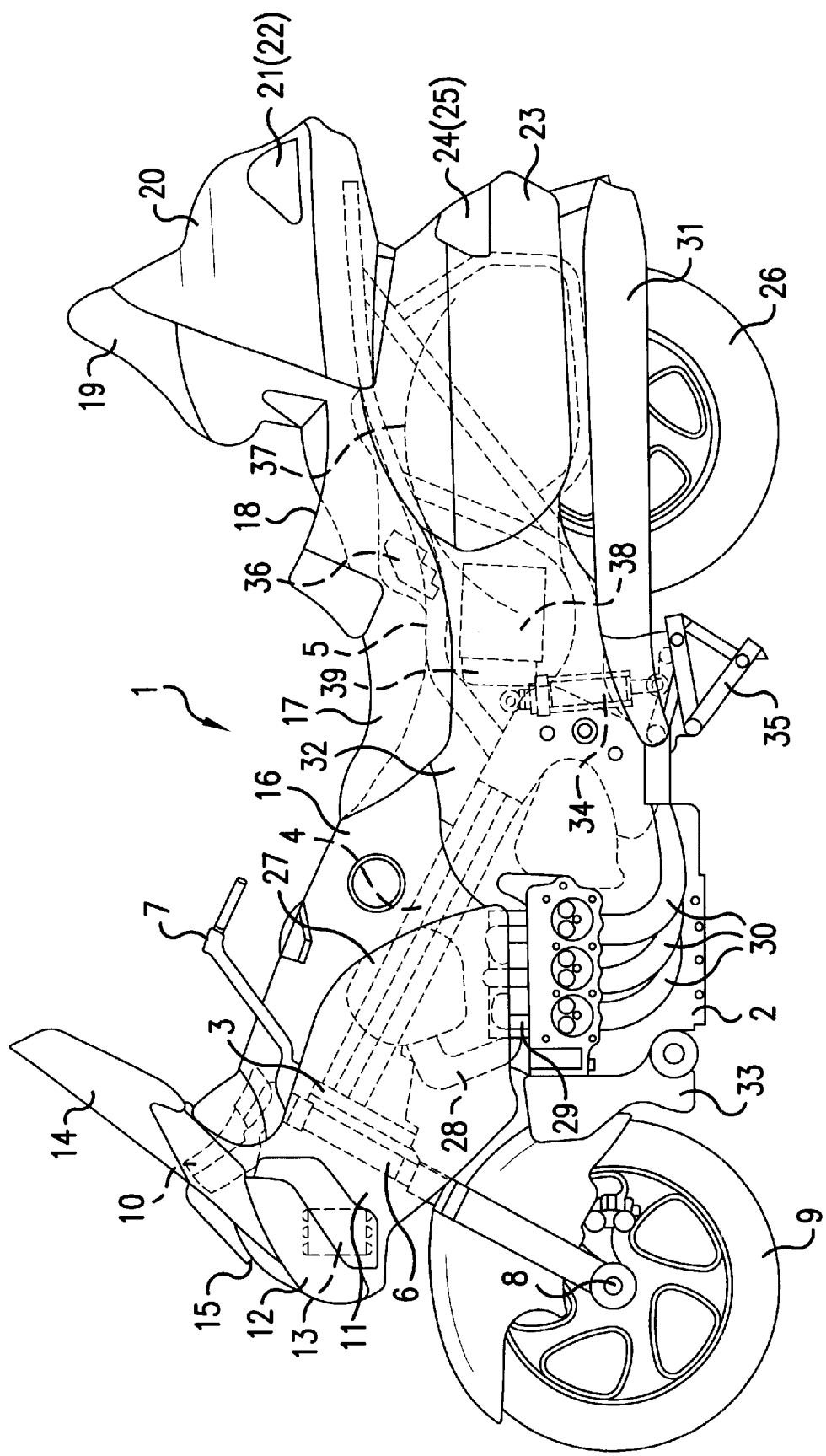
FIG. 2 is a side view of the motorcycle.

An embodiment of the present invention will now be described with reference to the drawings. FIG. 2 is a side view showing an appearance of a motorcycle on which a vehicular relay box is mounted that embodies the present invention. In FIG. 2, a motorcycle (hereinafter referred to as the vehicle) 1 carries a horizontally opposed six-cylinder engine 2 and a frame structure thereof is composed of a twin frame type main frame 4 extending in a bifurcated form backward of the vehicle from a steering head 3 and a rear frame 5 connected to and extending backward from the main frame 4. In the steering head 3 is mounted a front fork 6 pivotally and steerably, the front fork 6 comprising two pipes disposed right and left in a vehicular running direction. A handlebar 7 is fixed to the top of the front fork, that is, to a top bridge. A front axle 8 is secured to a lower end of the front fork 6 and a front wheel 9 is supported rotatably on the axle 8.

A display unit comprising a display panel and a control section, i.e., a meter unit 10, is provided in front of the handlebar 7. A lens 12, which is a clear lens, of a lamp device is mounted in front of a front fairing (cowl) 11 which covers a front portion of the vehicle 1. Inside the front cowl 11 is accommodated a voltage increasing device (ballast) 13 of an electric discharge lamp which is used as a lamp device.

A windscreen 14 is mounted above the front cowl 11 and an air inlet 15 is formed near the mounted portion of the windscreen 14.

A fuel tank 16 is mounted on the main frame 4. Behind the fuel tank 16 and on the rear frame 5 are mounted a rider seat 17 and a pillion 18. The pillion 18 is integral with the rider seat 17 and has a back rest 19. Behind the back rest 19 is provided a rear trunk 20. In a rear portion of the rear trunk 20 are mounted rear strap lamps 21 and turning signal lamps 22. Below the rear trunk 20 and on the right and left sides of a rear wheel 26 are provided side trunks 23, and in rear portions of the side trunks 23 are provided another pair of rear strap lamps 24 and another pair of turning signal lamps 25.

An air cleaner 27 is mounted below and in front of the fuel tank 16 and a throttle body 28 is mounted in front of the air cleaner 27, with intake manifolds 29 extending downward from the throttle body 28. The intake manifolds 29 are respectively connected to three cylinders disposed opposedly on the right and left sides of the vehicle body. Upstream of each of the cylinders is disposed a fuel injector (not shown). Exhaust manifolds 30 are drawn out backward from the engine 2 and are connected to mufflers 31.

Both lower sides of the rider seat 17 are covered with side covers 32 and a front lower cowl 33 is disposed in front of the engine 2. A relay box 36 is disposed below the rider seat 17 and along a rear fender 37. The relay box 36 is mounted on the rear fender 37.

A battery 38 is mounted below the relay box 36 and on the left-hand side of the vehicle body, and a fuse box 39 is disposed in front of the battery 38. The battery 38 is mounted on a support frame (see FIG. 1) suspended from the rear frame 5 and the fuse box 39 is screwed to the support frame.

Further, a rear cushion 34 is disposed below the rider seat 17. The rear cushion 34 is connected to a hydraulic unit (not shown) which can adjust the spring force electrically and which thereby can adjust an initial suspension load in accordance with the weight of the rider. The vehicle 1 can be allowed to stand up with use of a stand 35.

Figure 1:
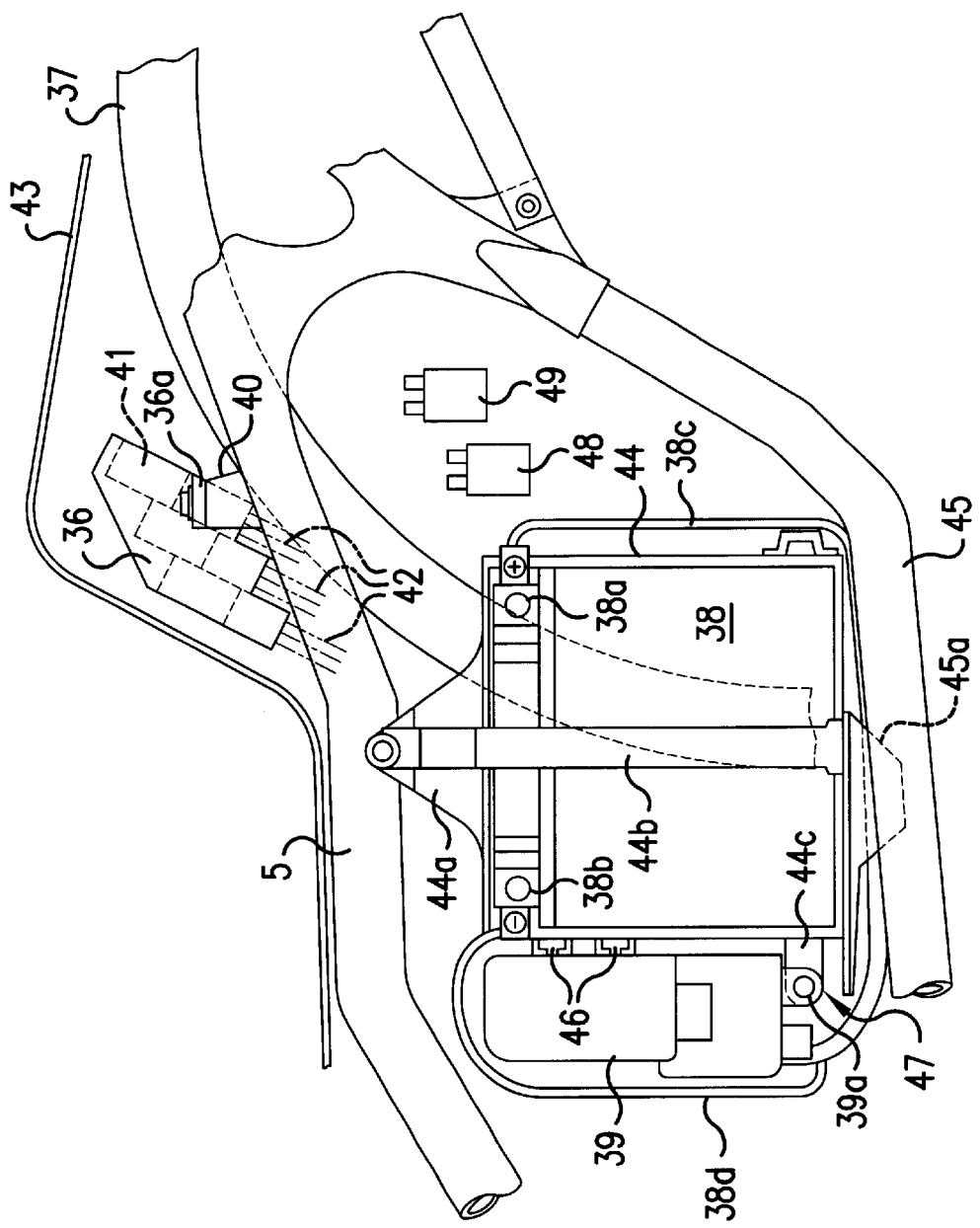
FIG. 1 is an enlarged view of principal portions of a motorcycle on which is mounted a fuse box according to an embodiment of the present invention.

The following description is now provided about the layout of both relay box 36 and fuse box 39. FIG. 1 is a side view of principal portions located near the rear fender of the motorcycle. In FIG. 1, the relay box 36 is disposed at a position slightly shifted to the front side from the top of the rear fender 37 and it has mounting plates 36a projecting nearly horizontally from both side faces thereof. On the other hand, the rear fender 37 is provided with bosses 40 having mounting surfaces respectively which are opposed to the mounting plates 36a of the relay box. The bosses 40 have bolt holes, to which the mounting plates 36a are bolted to fix the relay box 36. Within the relay box 36 are arranged a large number of relays 41 as component parts in such a multi-stage fashion as shown in FIG. 1. Conductors 42 are drawn out respectively from the relays 41 along the rear fender 37. As is seen from FIG. 1, the relay box 36 is disposed by effectively utilizing the space formed between the rear fender 37 and a seat bottom plate 43. The conductors 42 are connected to the fuse box 39.

On the other hand, the battery 38 is mounted on a battery support frame 44 below the relay box 36 and on the left-hand side of the vehicle body. An upper portion of the support frame 44 is suspended from the rear frame 5 through a bracket 44a and a lower portion thereof is supported by a lower frame 45 through a lower bracket 45a, the lower frame 45 extending backward from the main frame 4. Further, the battery 38 is fixed to the support frame 44 with a band 44b stretched between the bracket 44a and the lower frame 45.

The fuse box 39 is supported on the front side of the support frame 44. The fuse box 39 is engaged with the support frame 44 at both upper hook portions 46 and a lower clamp portion 47. The upper hook portions 46 comprise groove-like projections formed on the support frame 44 and projections formed on the fuse box 39 side. The lower clamp portion 47 comprises a plate 44c formed on the support frame 44 and an overhanging portion 39a formed on the fuse box 39 side and bolted to the plate 44c.

Cables 38c and 38d connected respectively to a positive terminal 38a and a negative terminal 38b are introduced from below the fuse box 39 into the fuse box and are connected to internal screw terminals which will be described later. Further, magnet switches 48 and 49 of a large capacity for opening and closing a circuit including a starter motor (not shown) are disposed at obliquely backward positions (near the rear portion of the vehicle body) with respect to the battery 38. The magnet switches 48 and 49 are supported by the rear frame 5 through a mounting member (not shown) and are connected through cables (not shown) to screw terminals in the interior of the fuse box 39.

Figure 3:
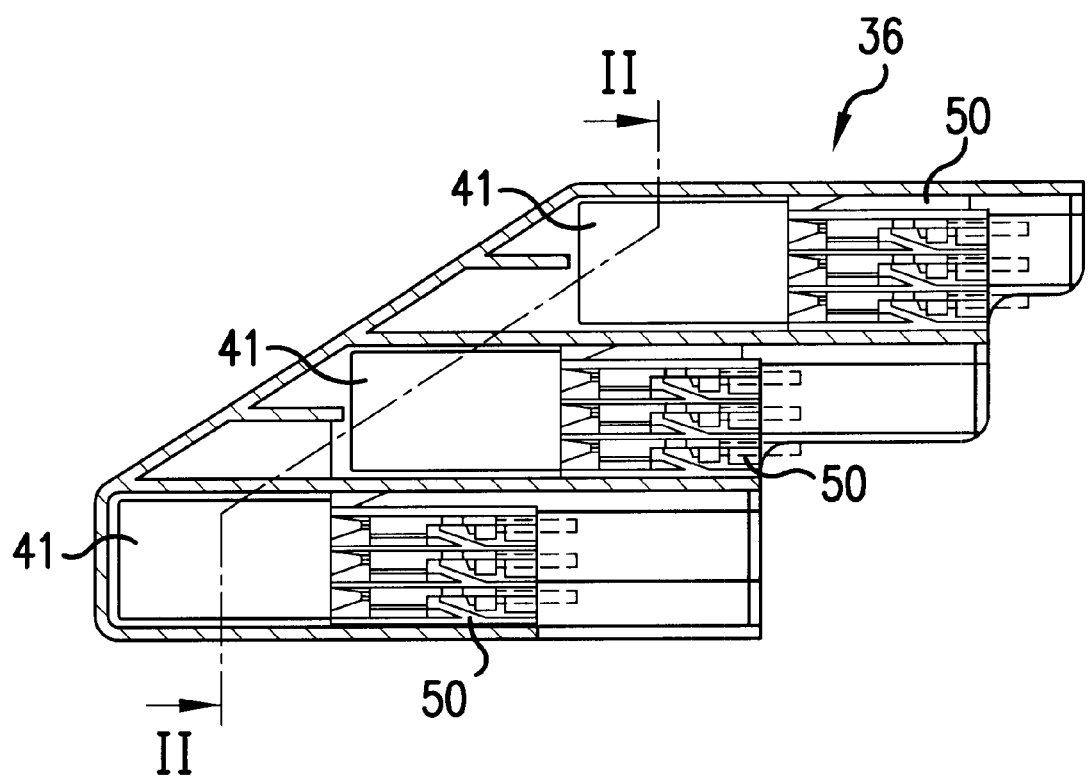
FIG. 3 is a sectional side view of a relay box.
Figure 4:
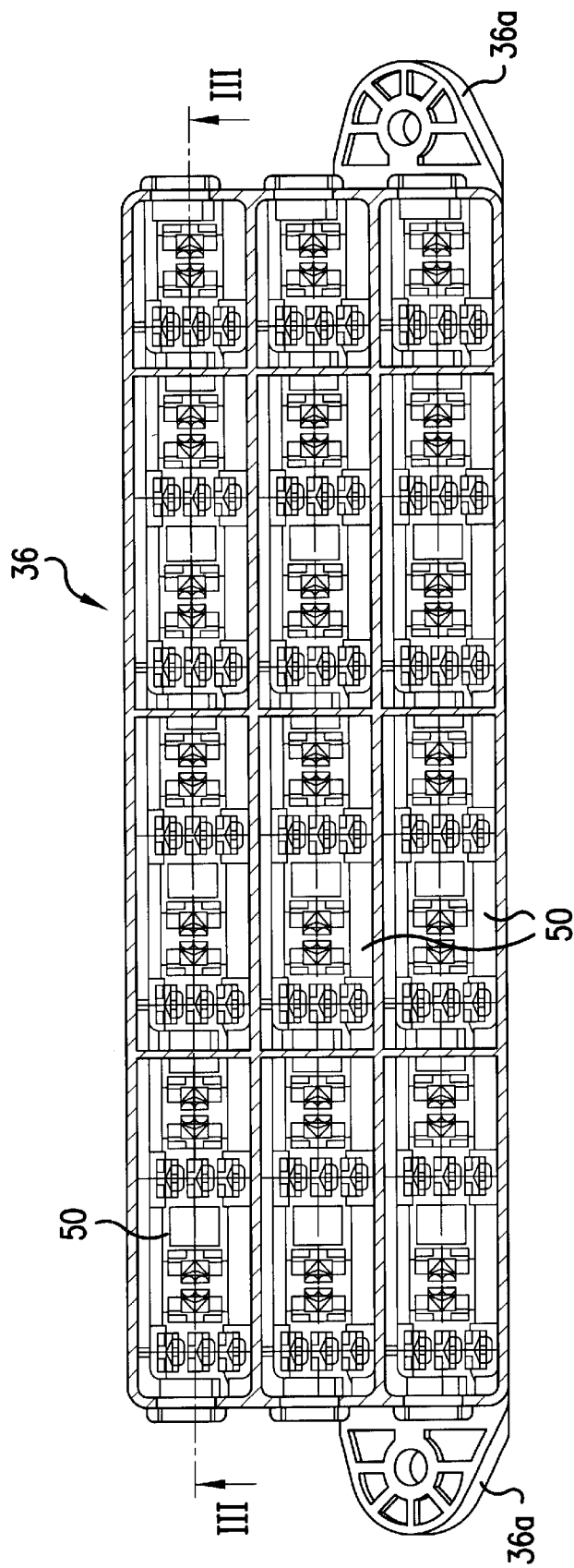
FIG. 4 is a sectional view taken on line II—II in FIG. 3.
Figure 5:
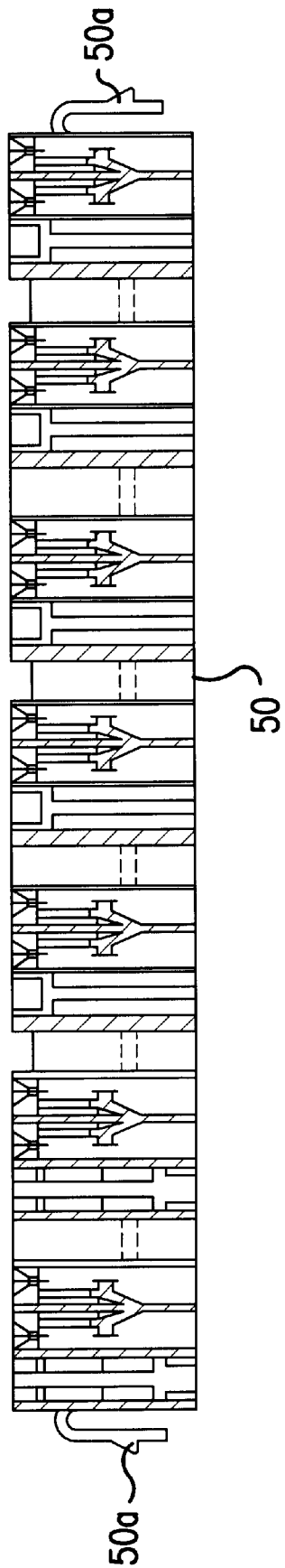
FIG. 5 is a sectional view taken on line III—III in FIG. 4.

FIG. 3 is a sectional view of the relay box 36, FIG. 4 is a sectional view taken on line B—B in FIG. 3, and FIG. 5 is a sectional view of a relay substrate 50 taken on line C—C in FIG. 4. FIG. 4 illustrates a state wherein the relays are removed. Hooks 50a for engagement with the relay box 36 are formed at both longitudinal ends of the relay substrate 50.

The relay box 36 is provided with the relay substrate 50 which is a long substrate and which supports the plural relays 41 in common. In FIG. 3, three such relay substrates 50 are arranged vertically in three stages. The relay substrates 50 are respectively provided with socket terminals for connecting plural connecting terminals (plugs) of the relays 41 in a lump. Seven relays 41 are mounted on each relay substrate, that is, a maximum of twenty-one relays 41 are mounted within the relay box 36. The relay substrates 50 are shifted from one another in a dismounting direction of the relays 41 like stairs (FIG. 3).

Thus, as is illustrated in FIG. 3, the relay box 36 is generally in the shape of parallelogram in side view and therefore can be installed suitably even in a complicated and narrow space defined by non-planar wall surfaces, such as the space between the rear fender 37 and the bottom plate 43 of the seat. It goes without saying that the number of relays 41 received within the relay box 36 is not limited to the one adopted in this embodiment, insofar as relay substrates each supporting plural relays in common are provided in plural stages and are shifted from one another so as to match the shape of an installing space.

Figure 6:
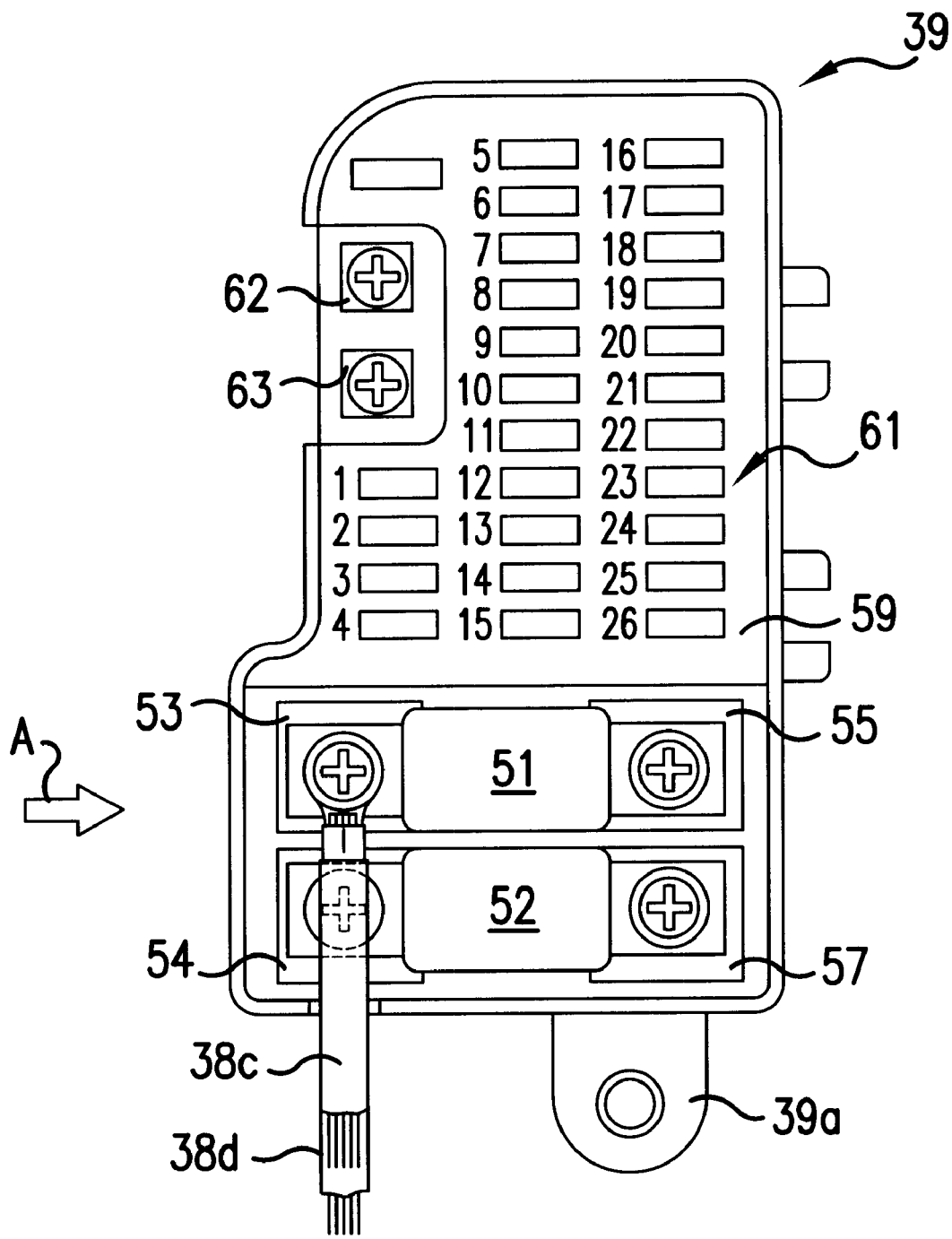
FIG. 6 illustrates the fuse box with a surface cover removed.
Figure 7:
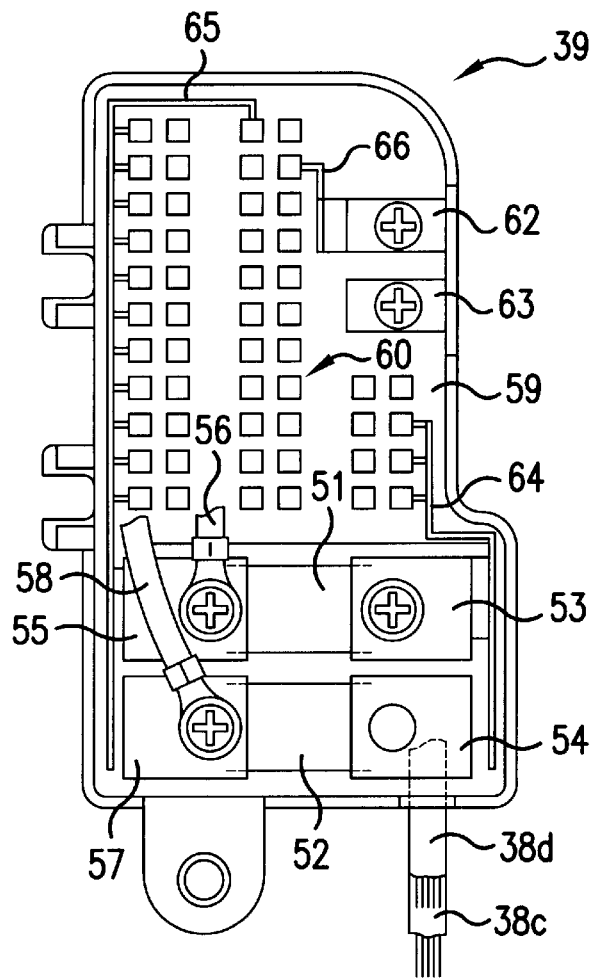
FIG. 7 illustrates the fuse box with a back cover removed.
Figure 8:
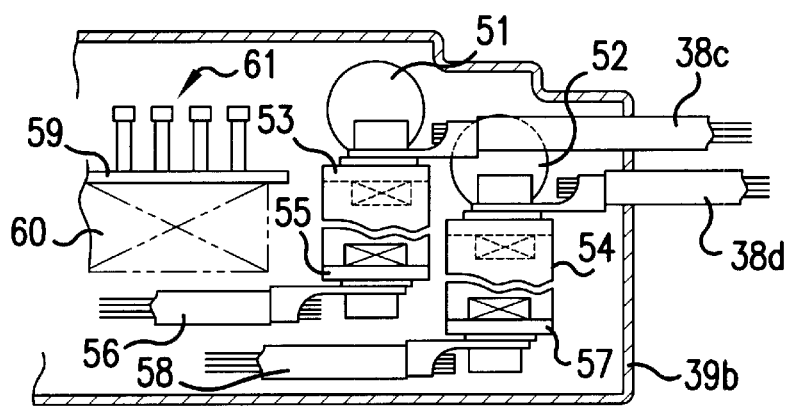
FIG. 8 is a sectional view of principal portions of the fuse box.

FIG. 6 illustrates a layout of fuses with a surface cover (a cover mounted on the left-hand side of the vehicle body) of the fuse box 39 removed, FIG. 7 illustrates a layout of fuses with a back cover of the fuse box removed, and FIG. 8 is a sectional view of principal portions as seen in the direction of arrow A in FIG. 6. In a lower position of the fuse box 39 are disposed block fuses 51 and 52, which are each composed of a cylindrical body and terminals connected thereto. The terminals of the block fuses 51 and 52 are respectively screwed to terminal boards 53, 55 and terminal boards 54, 57. One end of the block fuse 51 is screwed to the terminal board 53 together with cable 38c which is connected to the positive terminal of the battery 38, and one end of the block fuse 52 is screwed to the terminal board 54 together with cable 38d which is connected to the negative terminal of the battery 38. Further, cable 56 is screwed to the terminal board 55 to which is connected the opposite end of the block fuse 51, and cable 58 is screwed to the terminal board 57 to which is connected the opposite end of the block fuse 52.

A plurality of fuse plug-in terminals 60 are provided on a substrate 59 and blade fuses 61 are inserted into the plug-in terminals 60. A positive terminal board 62 and a negative terminal board 63 both for accessory purpose are provided on the substrate 59. Bus bars 64 and 65 are connected to the terminal boards 53 and 55, respectively. Further, a bus bar 66 is connected to the positive terminal board 62 for accessory. The bus bars 64, 65 and 66 are connected respectively to predetermined ones among plug-in terminals 60.

The cable 56 is connected to the positive terminal board 62 for accessory and the cable 58 is connected to the negative terminal board 63 for accessory. The positive side is connected to the magnetic switches 48 and 49 through the positive terminal board 62 for accessory. Conductors connected to the blade fuses 61 are drawn out to the side opposite to the battery 38 from a hole (not shown) formed in a side wall of the fuse box 39.

As shown in the figures, the block fuses 51 and 52 are arranged in line so that the respective screw portions for the terminal boards 53 and 54 are positioned along the wall surface of the fuse box 39. Therefore, the cables 38c and 38d, which are drawn out from the screw portions so as to perpendicularly intersect the longitudinal direction of the block fuses 51 and 52, are superimposed one on the other when seen in plan view as in FIG. 7. Actually, however, since the mounting surfaces of the block fuses 51 and 52 are different in height (see FIG. 8), the cables can be drawn out downward of the fuse box 39 without any obstacle.

Likewise, although the cables 56 and 58 are drawn out in the same direction, since their mounting surfaces are also different in height, the cables can be connected, without mutual interference, to the positive and negative terminals 62, 63 for accessory through the interior of the fuse box 39. Particularly, the mounting surfaces for mounting the cables 56 and 58 to the terminal boards 55 and 57 are stepped in the vicinity of the wall surface (back cover 39b) of the fuse box 39 with respect to the substrate 59 on which are mounted plug-in terminals 60 of the blade fuses 61, so that there is no interference with peripheral members which are mounted in associated with the plug-in terminals 60.

As set forth above, in the configuration wherein cables are screwed to block fuses 51 and 52 as circuit components and are drawn out in the same direction, the mounting surface of the circuit component (block fuse 52 in this embodiment) intersecting the screw portion of the other circuit component is set lower than the mounting surface of the other circuit component (block fuse 51). By so doing, the cables which are screwed to the mounting surfaces together with fuses do not interfere with each other. This is not limited to the arrangement of two block fuses. Also in the case of using a larger number of block fuses, a mutual interference of cables connected to screw portions can be prevented by setting the mounting surface of a circuit component intersecting a larger number of screw portions lower than those intersecting less screw portions.

The fuse box with fuse mounting surfaces set as above is suitable particularly for a motorcycle having subdivided circuits, a larger number of fuses and a limited mounting space.

As will be apparent from the above description, according to the first feature of the present invention, since plural cables drawn out in one direction do not interfere with each other, cable connecting terminals can be concentrated in one place within the connector box, thus permitting a high-density layout. Further, according to the second and third features of the present invention, the degree of cable layout freedom in the connector box increases because there is no interference of cable with an adjacent circuit component.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric connector box for a vehicle comprising;

a plurality of first circuit components arranged in said electric connector box in an adjacent manner, each of said first circuit components having end and a distal end;

a plurality of mounting surfaces, each surface for mounting one of the first circuit components;

screw portions disposed at the first end and the distal end of each of the plurality of first circuit components, said screw portions being adapted to connect cables thereto;

the screw portions of the plurality of first circuit components are arranged in a line and the first components are mounted on the mounting base together with cables by utilizing the screw portions so that the cables are drawn out from the electric connector box in a direction orthogonal to a longitudinal direction of the first circuit components; and a plurality of second circuit components are arranged in said electric connector box on a substrate;

the substrate for mounting the plurality of second circuit components, and the plurality of mounting surfaces for mounting first circuit components, are arranged adjacently to one another in a direction toward a back cover of the connector box; and each successive mounting surface for mounting first components is stepped down from the previous mounting surface.

2. The electric connector box for a vehicle according to claim 1, wherein said plurality of first circuit components are elongated block fuses.

3. The electric connector box for a vehicle according to claim 1, wherein the screw portions of one of the first circuit components are disposed at a higher elevation relative to the screw portions of another of the first circuit components.

4. The electric connector box for a vehicle according to claim 1, wherein the substrate and the plurality of mounting surfaces are shifted longitudinally relative to each other.

5. The electric connector box for a vehicle according to claim 4, wherein the first circuit components have screw terminals as said portions, and the second circuit components have plug in terminals.

6. An electric connector box for a vehicle containing a plurality of circuit components in an adjacent manner comprising:

a plurality of first circuit components having screw terminals adapted receive cables for connection thereto, and being mounted on a plurality of mounting surfaces;

a second circuit component having plug-in terminals;

the terminal of the circuit components having screw terminals being arranged in line and the cables being adapted to be drawn out from the screw terminals in a direction orthogonal to the circuit components having the screw terminals; and a difference in height being provided between mounting surfaces for the circuit components having screw terminals and a mounting portion of the circuit components having plug-in terminals, wherein the mounting surfaces for the circuit components having screw terminals are higher relative to the mounting portion of the circuit components having plug-in terminals, and each successive mounting surface for mounting circuit components having a screw terminals is stepped down from the previous mounting surface in a direction toward a back cover of the connector box.

7. The electric connector box for a vehicle according to claim 6, wherein the first circuit component having the screw terminals is a block fuse and the second circuit component having the plug-in terminals is a blade fuse.

8. The electric connector box for a vehicle according to claim 6, wherein said first circuit component is an elongated block fuse.

9. The electric connector box for a vehicle according to claim 6, wherein the mounting surfaces for the circuit components having screw terminals are disposed at a higher elevation relative to the mounting portion of the circuit components having plug-in terminals.

* * * * *